United States Patent [19]

Fox et al.

[11] 3,950,159

[45] Apr. 13, 1976

[54] PRODUCTS AND PROCESSES

[75] Inventors: Richard Fox, Rosanna; Hubert Charles Oldland, North Balwyn, both of Australia

[73] Assignee: ICI Australia Limited, Melbourne, Australia

[22] Filed: May 3, 1973

[21] Appl. No.: 356,809

[30] Foreign Application Priority Data

May 16, 1972 Australia............................ 8972/72

[52] U.S. Cl. ............................ 71/11; 71/23; 71/25; 252/352; 260/209 R
[51] Int. Cl.$^2$ C05F 11/00; C05F 7/00; B01F 17/00; C08B 1/00
[58] Field of Search .......... 71/64 C, 42, 11, 13, 23, 71/25, 27; 252/352; 260/209 R

[56] References Cited

UNITED STATES PATENTS

| | | | |
|---|---|---|---|
| 3,519,413 | 7/1970 | Trimbach | 71/42 |
| 3,829,412 | 8/1974 | Kunz | 252/352 X |

*Primary Examiner*—Frank A. Spear, Jr.
*Assistant Examiner*—Ferris H. Lander
*Attorney, Agent, or Firm*—Cushman, Darby & Cushman

[57] ABSTRACT

Compositions of matter suitable for use as a fertilizer and comprising a mixture of water; one or more materials capable of acting as a fertilizer; and at least one agent comprising at least one organic water soluble or water hydratable material capable of thickening said mixture and present in an amount sufficient to convert said mixture to a water resistant gel form.

12 Claims, No Drawings

PRODUCTS AND PROCESSES

This invention relates to compositions of matter which are suitable for use as fertilisers, in particular it refers to improved fertiliser compositions in the form of suspensions or slurries.

Fertilisers are compositions of matter which comprise those elements which enhance the growth of plants. Such elements include, for example, nitrogen, phosphorus and potassium. Commonly these are supplied as compounds such as ammonium salts, urea, nitrates, phosphates and potassium salts.

Fertilisers are most commonly supplied in a solid form but they may also be made in a liquid form as solution and suspension fertilisers. In solution fertilisers the compound or compounds are all dissolved in an aqueous phase but in suspension fertilisers some of the compound or compounds is present as a solid phase which remains as a stable suspension. Frequently this stable suspension is achieved by the addition of a clay type of suspending agent such as bentonite or attapulgite.

Although liquid fertilisers are not so commonly used as solid fertilisers they have advantages in economies in manufacturing costs, costs of drying and granulating are obviated, and in reduction of storage problems, solid fertilisers are prone to cake on storage. One disadvantage is that, by definition, they contain soluble compounds which are prone to leaching after application to the soil with the consequent loss of fertilising value to the crop.

We have now found that an improved suspension or slurry fertiliser can be made by using a thickening agent, as hereinafter defined, to produce the stable suspension or slurry with the added property, of being water repellent, thereby minimising leaching losses.

Accordingly we provide a new composition of matter suitable for use as a suspension or slurry fertiliser which composition comprises one or more compounds, capable of acting as fertilisers, water and a thickening agent as hereinafter defined.

Preferably the compounds capable of acting as fertilisers are selected from the group consisting of ammonium nitrate, urea, ammonium sulphate, ammonium chloride, monoammonium phosphate, diammonium phosphate, ammonium polyphosphates, superphosphate, concentrated superphosphate, potassium nitrate, potassium sulphate, potassium chloride, potassium dihydrogen phosphate, dipotassium phosphate, potassium polyphosphates and potassium metaphosphate. Mixtures of fertilisers may also be used. The nature of such mixtures and the ratios in which the various components thereof may be present is well known to those persons skilled in the art of fertilizer manufacture.

The amount of water which may be present in out composition will vary on the nature of the fertilizer or mixture of fertilisers in the composition and suitable amounts of water required for use in the preparation of various suspension fertilisers has been described in the literature. Preferably the amount of water present in our compositions is the minimum quantity required to provide a stable suspension which is capable of being handled as a liquid. Typically the amount of water present in our compositions in the range from 5 to 20% w/w of the total composition, but depending on the fertiliser component present amounts of water outside the above range may be used.

Although the nature of the thickening agents suitable for use in our invention is diverse we mean by the term thickening agent a compound or a mixture of compounds which is capable of acting as a thickening or suspending agent in a composition comprising water and preferably in addition also has water repelling properties. In referring to compounds or mixtures of compounds in the above definition we include not only the compounds themselves, but also compounds which have been modified by further treatment for example by crosslinking. Whilst such compounds are eminently satisfactory, the modified compounds often have even more enhanced properties of thickening and hydrophobicity which provide compositions which have enhanced suspension properties and are more water repellent.

One class of thickening agent useful in our invention includes substances which in the presence of an aqueous medium form a gel or at least form a viscous fluid of relatively high viscosity. From amongst these there may be mentioned galactomannan polysaccharides such as guar gum, Tara and Paloverde gums, pregelatinised starches, hydroxyethylcellulose, carboxymethylcellulose, tamarind seed flour and hydrophilic vinyl polymers such as polyacrylamide. Preferred members of this class of thickening agents are the galactomannans, particularly guar gum.

When compositions comprising polysaccharides such as guar gum are mixed with appropriate crosslinking agents, the viscosity and water resistance of the composition is increased. Crosslinking agents which may be employed for galactomannans include potassium and sodium dichromate, sodium tetraborate, borax, certain transition metal salts and certain soluble antimony and bismuth compounds. However, alkali metal dichromates, for example sodium and potassium dichromates, are especially preferred.

The proportion of polysaccharide and crosslinking agent used in preparing the thickening agent component of the fertiliser compositions of our invention can vary over quite wide limits depending on the agent used. For example, using guar gum with zinc chromate as the crosslinking agent the proportion of guar gum may vary from 0.1 to 5% w/w of total composition and the proportion of zinc chromate may vary from 0.01 to 3% of total composition.

Alternatively a mixture of sodium or potassium dichromate and a soluble iron, zinc, aluminium or antimony salt may be used. For example if sodium or potassium dichromate is used, the proportion of sodium or potassium dichromate in the composition is preferably in the range from 0.003 to 1.0% w/w, and the proportion of soluble salt is preferably in the range from 0.001 to 0.3% w/w of the composition. There are many alternative combinations of materials which will on mixing give a viscous or gelled crosslinked water resisting composition.

A further class of thickening agents suitable for use in our invention are agents formed from the in situ polymerisation of monomers or mixtures of monomers. Examples of monoethylenically unsaturated monomers which are suitable include amides such as acrylamide, methacrylamide and N-methylacrylamide and hydroxyalkyl derivatives such as alpha,2-hydroxyethylacrylamide and alpha-hydroxymethylacrylamide; acids such as acrylic acid and methacrylic acid; salts of acrylic acid such as sodium, potassium or ammonium acrylate; and soluble salts of monovinylpyridines, particularly the nitrate salts of the 4-vinylpyridine. Acrylamide is a particularly preferred monomer because of its low cost and rapid polymerisation in the presence of free radical polymerisation promoters. Usually, the concentration of acrylamide used ranges from 0.3 to 10% and especially from 0.5 to 5%. Suitable promoters include sodium, potassium and ammonium salts of inorganic peracids such as persulphates, perborates and pervanadates; hydrogen peroxide; and organic peroxide and azo catalysts such as azobis(isobutyronitrile), alpha,alpha'-azobis(alpha,gamma-dimethyl-gamma-methoxyvaleronitrile), tertiary butyl hydroperoxide, methylvinyl ketone peroxide, benzoyl peroxide and peracetic acid. Persulphates are usually preferred. Redox systems, that utilise a source of persulphate ion ($S_2O_8^=$) as one component are suitable throughout a range of concentrations of inorganic persulphate salt. They can be used alone to promote the copolymerisation reaction or an added reducing agent can also be employed to form a redox couple. Reducing agents that can also be used if desired include nitrogen bases such as hydroxylamine, carbohydrazide or hydrazine. If needed, higher rates of polymerisation are achieved at lower temperatures when the polymerisation system also includes a minor amount of metal ion, usually a Group IB metal ion. These metal ions are introduced as soluble inorganic or organic salts, e.g. as the nitrates, sulphates or acetates. Other useful persulphate couples are $HSO_3^-(S_2O_8)^{-2}$ and $Fe^{+2}(S_2O_8)^{-2}$ and $S_2O_3-(S_2O_8)^{-2}$ and nitro-tris-propionamide $-(S_2O_8)^{-2}$.

In general, the total amount of promoter used varies with the particular promoter and monomers, and increases proportionately with the desired speed of polymerisation, but usually is at least 0.002% and preferably within the range of about from 0.002 to 3% based on the total weight of the phase containing monomers to be polymerised, large excesses of promoter having no detrimental effect on the gel structure. The optimum concentration of the preferred persulphate ions, based on total monomers, i.e. both mono- and polyethylenically unsaturated, can vary considerably depending on the particular polymerisation system, the desired consistency of the gel, and the presence or absence of supplementary promoter components, but in general will be about from 0.005 to 2% by weight of the aqueous phase.

A still further class of water resisting agents suitable for use in our compositions are biopolymeric materials. By biopolymeric material we mean polymeric material which is produced by a process comprising the microbial transformation of carbohydrate material. Such material may be prepared fo example by reacting a carbohydrate with a microorganism to obtain a polymeric material which differs fundamentally from the parent polymeric material in respect of composition, properties and structure. Suitable carbohydrates include sugars such as pentoses or hexoses, for example glucose, sucrose, fructose, maltose, lactose, galactose, and starches, for example soluble starch, corn starch and the like. Since such carbohydrates need not be in a refined state, many crude products having a high carbohydrate concentration may be utilized. Amonst suitable materials there may be mentioned raw sugar, crude molasses and the like. Microorganisms suitable for effecting the microbial transformation of carbohydrates may be for example plant pathogenic bacteria such as plant pathogens which produce exudates at the site of lesions on infected plants. Typical of such microorganisms are the species of the genus Xanthomonas. Thus for example a heteropolysaccharide may be prepared from glucose by the plant pathogen *Xanthomonas campestris* to give a product comprising D-mannose, D-glucose and D-glucoronic acid as the potassium or sodium salt. Similarly extracellular polysaccharides of a similar structure to the above may be prepared from glucose or sucrose by the plant pathogenic microorganisms *Xanthomonas oryzae* or *Xanthomonas phaseoli*. It is of interest to note that the polysaccharide from *X. oryzae* resembles that from *X. campestris* since both contain combined pyruvic acid. Although the structural significance of the pyruvic acid in these polysaccharides is obscure, it appears to be present as a ketal group, as in the case of red seaweed polysaccharides. Amonst other species of organisms of the genus Xanthomonas from which suitable biopolymers may be prepared there may be mentioned *X. malvacearum; X. translucens f. sp. hordeiavenae; X. translucens f. sp. undulosa; X. carotae; X. hederae; X. papavericola; X. incannae; X. vesicatoria X. begoniae* and *X. vasculorium*. biopolymers may also be produced from organisms other than those of the genus Xanthomonas. Thus there may be mentioned amongst the bacterial polysaccharides the dextran produced by *Leuconostoc mesenteroides* and related species, and the glucosan produced by *Agrobacterium tumefaciens*. A biopolymer typical of those suitable for use in our invention is the material "Biopolymer" XB 23 (Registered Trade Mark) available commercially from General Mills Inc. of Minneapolis, Minnesota, U.S.A. This material comprises a biopolymeric material derived from a polymer which has been reacted with X. campestris. suitable material is the water soluble polymer known as XC polymer available commercially from Esso Production Research Co. of Houston, Texas, U.S.A. This polymer is produced by the action of bacteria of the genus Xanthomonas on carbohydrates to give a biopolymer of a very complex chemical structure.

Accordingly we provide fertiliser compositions of matter as described above wherein the thickening agent comprises matter prepared from a carbohydrate which has been reacted with a microorganism microorganism of the genus Xanthomonas.

We also provide fertiliser compositions of matter as described above wherein the thickening agent comprises matter prepared from a carbohydrate which has been reacted with amicrooganism of the species *Xanthomonas campestris*.

The biopolymeric materials referred to above may be treated further by means of crosslinking agents for example a boron containing compound such as borax, ammonium borate, sodium metaborate or sodium tetraborate or a chromium salt such as chromic chloride. Compositions comprising both crosslinked biopolymeric materials tend to increase in water resistance on standing and their viscosity and suspending characteristics are also enhanced. Amounts of crosslinking agents when used with biopolymeric materials can be varied from about 5 to 50% by weight of the biopolymeric material. Preferably the concentration of crosslinking agent used with biopolymeric materials lies in the range from about 10 to 20% by weight of the biopolymeric material. The desired amount of biopolymer to be used in our compositions may be determined by simple experiment and in general we have found that amounts from as little as 0.1% w/w to as much as 5% w/w of the total weight of the composition are useful and amounts from 0.5 to 3% w/w of the total weight of the composition are satisfactory for most purposes.

It lies within our invention to incorporate into our compositions of matter additional materials conventionally found in fertiliser compositions. From amongst such materials there may be mentioned for example, the wellknown micronutrients such as compounds of zinc, iron, cobalt, molybdenum, copper, boron or manganese.

Our compositions may be prepared by continuous or batch processes analogous to those used to prepare the suspension fertilisers known in the art but using thickening agents according to our invention. Thus for example for the preparation of fertiliser suspensions containing nitrogen and phosphorus for example a suspension wherein the percentage of nitrogen in the composition is 12% w/w and the percentage of phosphorus, expressed as $P_2O_5$, in the composition is 40% — commonly referred to as a 12 - 40 - 0 fertiliser — a continuous hot mix plant may be used. Such suspensions are suitably made by ammoniating superphosphoric acid with anhydrous ammonia and simultaneously adding the desired amount of water; the conditions are controlled to maintain pH, typically about 6 to 6.5, and specific gravity within desired limits. The reaction temperature is kept at about 80°C by cooling water. To the base material so prepared there is then added the desired amount of thickening agent according to our invention and the resultant product is cooled to about 100°F before it is stored or loaded for shipment. It is desirable that the pH of the base material described above be at least 4 prior to adding certain types of thickening agent thereto. The product described above is suitable also as an intermediate for the preparation of suspension fertilisers comprising potassium. Thus the above product can be cold mixed with urea-ammonium nitrate solution or suspension, water and potassium chloride to produce grades of suspension fertilisers such as 15 - 15 - 15, 9 - 18 - 27, 9 - 27 - 18 and 7 - 21 - 21 (The last number in these designations refers to the percentage of potassium, expressed as $K_2O$, present in the composition). If the processes described above are repeated but the superphosphoric acid is replaced by wet process phosphoric acid fertilisers typified by the grades 8 - 24 - 0 and 12 - 12 - 12 may be prepared. A high nitrogen suspension fertiliser may be prepared using a batch process by mixing solid powdered or prilled urea, ammonium nitrate solution and thickening agent. In one typical procedure a concentrated solution of ammonium nitrate is heated to about 60°C., the desired amount of thickening agent is then dispersed in the solution and finally the urea is added and the product is cooled rapidly to about 35°C. Similar products may be obtained when the urea is in solution and the ammonium nitrate is in solid form; alternatively both the urea and the ammonia may be in the form of hot aqueous solutions. A typical grade of fertiliser made by these processes is a 37 - 0 - 0 fertiliser. In yet another process granular ammonium polyphosphate may be mixed with hot water urea, thickening agent and potassium chloride to produce suspension fertilisers of grades such as 9 - 37 - 5, 10 - 30 - 5, 8 - 32 - 5 and 12 - 27 - 5. In preparing the compositions according to our invention our thickening agent may be added in toto at a suitable shage or alternatively it may be in more than one portion. Yet again, for example where it is desired to use a crosslinked thickening agent, the thickening agent itself may be added to the mixture to form a suspension fertiliser composition, and the crosslinking agent may be added separately to such a composition at a later time to provide a composition of higher viscosity and of enhanced water resistance.

Accordingly in the known process of preparing suspension fertilisers by mixing one or more fertilisers components with water in the presence of a suspending agent we provide the improvement wherein the suspending agent is at least one thickening agent as hereinbefore defined.

It will be appreciated from the description above that the compositions of our invention may vary widely in the percentages of the ingredients comprising the fertiliser component. It is usually desirable that the compositions be as concentrated as possible consistent with a practical flowable viscosity. Typical grades of fertiliser compositions according to our invention having a high fertiliser content and a practical flowable viscosity are set out hereinbelow by the conventional three number designation wherein the first, second and third numbers the percentage thepercentage by weight 200 nitrogen as N, phosphorus as $P_2O_5$ and potassium as $K_2O$ respectively in the composition. Such grades include for example compositions designated as: 20-20-0; 15-15-15; 12-12-24; 9-9-27; 8-8-32; 15-30-0; 12-124-12; 10-20-20; 9-18-27; 7-14-28; 12-36 -0; 10-30-10; 9-27-18; 7-21-21; 7-21-28; 6-18-30; 5-15-30; 24-12-0; 20-10-10; 16-8-16; 14-7-21; 12-6-24; 16-16-8; 14-21-7; 14-28-7; 14-21-14; 12-18-18; 24-8-0; 21-7-7; 18-6-12; 15-5-15; 21-14-0; 18-12-6; 18-12-12; 15-10-15; 19-0-19 and 0-0-40.

The suspension fertilisers of this invention may be spread conveniently through conventional devices. Thus they may be applied at ground level or by means of spraying from an aircraft. Because of the characteristics of our thickening agents our compositions are more stable and more hydrophobic than the suspension fertiliser compositions of the prior art. They also have the attendent advantage that it is easier to make compositions having a desired suspension characteristic and a desired hydrophobicity than hiterto. In the prior art where conventional suspending agents, such as clays, were used difficulties were often experienced in pumping compositions during manufacture and to storage units because of the high viscosity induced by the suspending agent. Such difficulties have been minimized in the preparation of our compositions since if a high viscosity composition is desired, the composition may be prepared by using an amount of thickening agent sufficiently small such that difficulties in pumping are not encountered, and then to add to and mix with the composition a crosslinking agent to increase the viscosity of the composition to the desired extent. By suitable choice of mixing and dispensing equipment such an addition and mixing of a crosslinking agent may be performed in the apparatus which is used to spread or spray the composition on to the ground. For example, the mixing may be performed just prior to spraying so that, although on discharge the composition is fluid, crosslinking will take place during the period when the fertiliser is travelling from the distributor to the point of application. In which case the crosslinking may be such as to produce highly water-resistant, 'semi-solid' particles. This technique is of special use in the application of suspension fertilisers from aircraft. Compositions of our invention comprising ammonium phosphate for example also find utility as fire retarding chemicals.

Our invention is now illustrated by, but not limited to, the following examples wherein all parts and percentages are expressed on a weight basis unless otherwise stated. Example 11 is a comparative example not according to our invention.

EXAMPLE 1

To a reaction vessel there was charged 10 parts of water and 31.5 parts of ammonium nitrate and the stirred mixture was heated to 60°C and 0.6 part of guar gum was dispersed therein. 57.9 parts of prilled urea were then added to the above mixture. The resultant suspension was then cooled rapidly to room temperature to provide a suspension fertiliser in the form of a gel and containing about 37% nitrogen. After storage for two weeks no sedimentation was observed in the product.

EXAMPLE 2

The general procedure of Example 1 was repeated, but 0.1 part of sodium dichromate was added to and admixed with the composition as prepared in Example 1 2 hours after that composition had been prepared. A product similar to that of Example 1 was obtained except that the product of the present example was more viscous and the gel was more robust than that obtained in Example 1.

EXAMPLE 3

The general procedure of Example 1 was repeated but the guar gum of that Example was replaced by 1 part of "Biopolymer" XB23. The product so obtained had characteristics similar to those of the product of Example 1.

EXAMPLE 4

The general procedure of Example 1 was repeated but the guar gum of that Example was replaced by 0.3 part of XC polymer. A product having characteristics similar to those of the product of Example 1 was obtained.

EXAMPLE 5

The general procedure of Example 4 was repeated but 0.03 part of chromic chloride was added to and admixed with the composition as prepared in Example 4 2 hours after that composition had been prepared. A firm gelled product was obtained and no sedimentation therefrom was observed after the product had been stored for 1 week.

EXAMPLE 6

The general procedure of Example 1 was repeated but the guar gum of that Example was replaced by a mixture consisting of 0.5 part of "Biopolymer" XB23 and 0.5 part of guar gum. A firm gelled product was obtained and no sedimentation therefrom was observed after the product had been stored for one week.

EXAMPLE 7

A ⅛ inch internal diameter high pressure nylon tube was threaded through a 1 inch internal diameter high pressure PVC hose. The nylon tube was attached by means of a hook arrangement to the entrance of an interfacial surface generator mixer of conventional design comprising 16 × ½ inch auger elements alternately pitched to the right and left hand and fixed so that the leading edge of one element was at right angles to the trailing edge of the abutting element. The mixer was housed in a metal tube of internal diameter 1 inch and length 3 feet, said metal tube being attached to the PVC hose.

By means of a suitable metal coupling the nylon tube was attached to one head of a pneumatically driven dual headed diaphragm metering pump capable of delivering two separate streams, and the PVC hose was connected to a high speed rotary mixer which was in turn connected to a constant displacement pump fitted with a screw feed. The other head of the diaphragm metering pump was connected to the high speed rotary mixer. The interfacial surface generator mixer attached to the PVC hose was connected to a spraying device suitable for applying suspension fertilisers to arable areas. A composition prepared as described in Example 1 was pumped from a container by the constant displacement pump through the high speed rotary mixer at the rate of 100 lb/minute. A solution of potassium antimony tartrate (1.5 lb/100 lb water), a first component of a crosslinking system, was injected at a rate of 270 ml/minute into the high speed rotary mixer using one head of the dual headed diaphragm metering pump and mixed with the ammonium nitrate mixture therein. The resultant composition leaving the high speed rotary mixer was passed through the PVC loading hose. Simultaneously the second component of the crosslinking system, sodium dichromate solution (10 lb/100 lb water), was metered down the nylon tube at a rate of 270 ml/minute using the second head of the dual headed diaphragm metering pump.

The separate streams from the PVC hose and the nylon tube were mixed by the interfacial surface generator mixer and pumped through the spraying device. Within about 15 seconds of being sprayed on to the ground the viscosity of the composition had increased markedly to provide a layer of a gelled suspension fertiliser on the surface of the ground.

EXAMPLE 8

In a laboratory scale plant there was produced by means of a continuous hot mix process a suspension fertiliser approximating to the grade known as 5-15-15. To a reactor fitted with a heat exchanger, pumping means, an agitator and an ammonia distributor there was fed wet process phosphoric acid (72% $P_2O_5$) at the rate of 167 parts/hr. Ammonia and water were fed to the reactor at the rate of 44 parts/hr and 80 parts/hr respectively. The reaction temperature was maintained at about 82°C by cooling water. The resultant ammonium phosphate solution was pumped to a separate mixing tank to which was fed potassium chloride (194 parts/hr), a solution of a mixture of urea and ammonium nitrate containing 32% nitrogen (262 parts/hr), guar gum (9 parts/hr) and water (44 parts/hr). The resultant product, obtained at a rate of approximately 800 parts/hour, was cooled to 38°C and was in the form of a suspension fertiliser approximating to the grade 15-15-15.

EXAMPLE 9

Wet process phosphoric acid containing 54% $P_2O_5$ was ammoniated to produce a product of the grade 8-24-0. To this product there was added polyacrylamide to provide a stabilised suspension fertiliser containing 1.5% acrylamide. With this stabilised suspension there was mixed a urea-ammonium nitrate solution (30% N), potassium chloride and water to make a stabilised suspension fertiliser of the grade 12-12-12. No sedimentation was observed after storage at room temperature for 7 days.

EXAMPLE 10

So as to demonstrate the enhanced water resistance of our compositions the following procedure was adopted. An appropriate amount of the stored compositions set out below in Table 1 chosen such the amount of composition contained 5 gram of ammonium nitrate was placed in a mesh basket and suspended in 200 ml of water at room temperature. After 5 minutes the basket and its residual content was removed from the aqueous medium. The aqueous medium was stirred until it was homogeneous and a 20 ml aliquot taken therefrom was analysed for its ammonium nitrate content. The basket and its residual content were then replaced in the aqueous medium and the above procedure was repeated after the total time of immersion of the sample was 20 and 75 minutes. Table 1 sets out the percentage of ammonium nitrate leached from the compositions at the various times.

TABLE 1

| Composition of Example No. | Time elapsed between preparation and test (days) | Time of immersion (minutes) | % Ammonium nitrate leached from the composition |
|---|---|---|---|
| 2 | 1 | 5 | 10.4 |
|   |   | 20 | 24.2 |
|   |   | 75 | 58.8 |
| 3 | 1 | 5 | 33.0 |
|   |   | 20 | 60.7 |
|   |   | 75 | 90.9 |
| 4 | 4 | 5 | 26.4 |
|   |   | 20 | 51.4 |
|   |   | 75 | 98.8 |
| 5 | 1 | 5 | 8.8 |
|   |   | 20 | 26.8 |
|   |   | 75 | 72.7 |

EXAMPLE 11

For the purposes of comparison the general procedure of Example 10 was repeated but the compositions thereof were replaced by 5 gram of the ammonium nitrate used to make the compositions. Solution of the ammonium nitrate was rapid and was complete in less than 5 minutes after the initial immersion.

EXAMPLE 12

This example demonstrates the use of our compositions as fire retardants. The general procedure of Example 7 was repeated except that the composition of Example 1 was replaced by a mixture preparing by mixing together 40 parts of monoammonium phosphate, 60 parts of water, and 1 part of guar gum and the mixed streams were sprayed on to a fire instead of on to the ground. The fire used in this example was created by igniting a mixture of wood, oil and solvents placed in a metal tray, and allowing it to become established as a steady fire prior to treatment. When the composition was sprayed on to the fire it caused the rate of combustion to be diminished and some portions of the fire were extinguished.

We claim:

1. In a process of preparing a suspension fertilizer mixture by mixing one or more fertilizer components with water in the presence of a suspending agent, the improvement wherein said suspending agent is at least one agent comprising at least one polysaccharidic gum being cross-linked by a substance comprising a redox system and selected from the group consisting of cross-linked galactomannan polysaccharides and crosslinked biopolymeric material which is produced by a process comprising the microbial transformation of carbohydrate material, and wherein said agent constitutes from 0.1% w/w to 5% w/w of said fertilizer mixture.

2. A composition of matter suitable for use as a water repellent fertilizer and comprising a mixture of water; one or more compounds capable of acting as a fertilizer and at least one polysaccharidic gum selected from the group consisting of crosslinked galactomannan polysaccharides and crosslinked biopolymeric material which is produced by a process comprising the microbial transformation of carbohydrate material, said gum being cross-linked by a substance comprising a redox system and being capable of thickening said mixture and being present in an amount from 0.1 part to 5 parts by weight per 100 parts by weight of said composition.

3. A composition of matter according to claim 2 wherein the said gum is crosslinked guar gum.

4. A composition of matter according to claim 2 wherein the said material comprises biopolymeric material prepared from a carbohydrate which has been reacted with a microorganism of the genus Xanthomonas.

5. A composition of matter according to claim 4 wherein the said microorganism is of the species *Xanthomonas campestris*.

6. A composition of matter according to claim 4 wherein said material is present in an amount from 0.1 part to 5 parts by weight per 100 parts by weight of said composition.

7. A composition of matter according to claim 6 wherein said material comprises in addition a chromic or boron containing compound said compound being present in an amount from 5 to 50% by weight of said biopolymeric material.

8. A composition of matter according to claim 2 wherein said substance is a water soluble compound present in an amount in the range from 0.005 part to 3 parts by weight per 100 parts by weight of said composition.

9. A composition of matter according to claim 8 wherein said compound is a dichromate of an alkali metal.

10. A composition of matter according to claim 2 wherein said redox system has as an oxidizer component an alkali metal dichromate present in an amount from 0.003 to 1 part per 100 parts of said composition and has as a reducer component a water soluble compound derived from iron, zinc, aluminium or antimony present in an amount from 0.001 to 0.3 part per 100 parts of said composition.

11. A composition of matter according to claim 10 wherein said oxidizer component is sodium dichromate or potassium dichromate and said reducer component is potassium antimony tartrate.

12. A composition of matter according to claim 2 wherein the said material comprises polyacrylamide.

* * * * *